United States Patent
Geisinger (10) Patent No.: US 6,269,678 B1
(45) Date of Patent: Aug. 7, 2001

(54) LEAK DETECTOR

(75) Inventor: Penrod Geisinger, Humboldt, AZ (US)

(73) Assignee: Vaporless Manufacturing Inc., Prescott Valley, AZ (US)

( * ) Notice: Subject to any disclaimer, the term of this patent is extended or adjusted under 35 U.S.C. 154(b) by 0 days.

(21) Appl. No.: 09/515,002

(22) Filed: Feb. 29, 2000

Related U.S. Application Data (60) Provisional application No. 60/184,084, filed on Feb. 22, 2000.

(51) Int. Cl.[7] .................................................. G01M 3/28
(52) U.S. Cl. .............................. 73/1.05; 73/40.5 R; 73/40
(58) Field of Search .............................. 137/491, 565.13; 73/1.05, 40, 40.5 R (56) References Cited

U.S. PATENT DOCUMENTS

| | | |
|---|---|---|
| 1,622,069 | 3/1927 | Thomson et al. . |
| 2,952,388 | 9/1960 | Deters ................................. 222/52 |
| 2,979,939 | 4/1961 | Shuh ..................................... 73/40 |
| 3,183,723 | 5/1965 | Deters ................................ 73/40.5 |
| 3,236,256 | 2/1966 | Valentine ........................... 137/509 |
| 3,454,195 | 7/1969 | Deters ................................. 222/52 |
| 3,621,872 | 11/1971 | Fisher ................................ 137/494 |
| 3,692,505 * | 9/1972 | Deters ................................ 137/491 |
| 3,817,087 | 6/1974 | Mooney ............................... 73/40.5 |
| 3,940,020 | 2/1976 | McCrory et al. ....................... 222/52 |
| 4,116,044 | 9/1978 | Garrett ................................ 73/40.5 |
| 4,269,061 | 5/1981 | Hatsuno et al. ......................... 73/40 |
| 4,410,109 | 10/1983 | Murrell, Jr. et al. .................. 222/52 |
| 4,573,343 | 3/1986 | Huiber .................................. 73/40 |
| 4,576,037 | 3/1986 | Cox ..................................... 73/40.5 |
| 4,966,190 | 10/1990 | Geisinger ........................... 137/613 |
| 5,014,543 | 5/1991 | Franklin .............................. 73/40.5 |
| 5,042,290 | 8/1991 | Geisinger ............................ 73/40.5 |
| 5,092,158 * | 3/1992 | Tuma et al. ........................... 73/1.05 |
| 5,157,958 | 10/1992 | Geisinger ................................ 73/3 |

* cited by examiner

*Primary Examiner*—John Rivell
(74) *Attorney, Agent, or Firm*—Cahill, Sutton & Thomas P.L.C.

(57) ABSTRACT

A leak detector includes an off-center mounted metering pin cooperating with a single cross-hole in a poppet valve to accommodate adjustment of the flow rate past the metering pin by rotating the poppet valve about its longitudinal axis. A flow director, cooperating with the poppet valve, directs all flow into the leak detector directly into the line during initial flow into the leak detector. A piston, responsive to line pressure, is sized smaller in diameter than the poppet valve to cause the line pressure to increase rapidly and significantly during the leak sense mode and which size permits reduction in size and weight of the leak detector.

21 Claims, 11 Drawing Sheets

LEAK DETECTOR

CROSS-REFERENCE TO RELATED APPLICATION

This application is based upon and includes a disclosure contained in a provisional application entitled "LEAK DETECTOR" filed Feb. 22, 2000, and assigned Ser. No. 60/184,084, (our docket number 3410-P-19), which application is assigned to the present assignee.

BACKGROUND OF THE INVENTION

1. Field of the Invention

The present invention relates to leak detectors and, more particularly, to a leak detector which increases the line pressure to as high a value as possible during the metering cycle of the leak detector.

2. Description of Related Art

Gasoline dispensers used at automotive service stations dispense gasoline from an underground tank through a nozzle placed in the fill tube of an automobile gas tank. The underground tank includes a pump actuated by a user upon manipulation of a lever at the time of lifting the nozzle from its stored position on the gasoline dispenser. Downstream of the pump is a conventional leak detector, which may be of a piston or diaphragm type. For example, a diaphragm leak detector long used since 1976 is known as a Red Jacket Two-Second Model No. 116-017 Leak Detector; a similar unit has been used since 1959. These units are manufactured by the Marley Pump Company.

The gasoline line downstream of the leak detector may have a leak which creates an environmental hazard to the adjacent underground and a severe safety hazard to personnel. Such leaks are difficult to detect from the surface of the ground and the leak detectors serve the function of precluding delivery of gasoline through the delivery line if a leak of greater than a predetermined rate is present. Trapped air in the delivery line usually does not present a safety hazard but it may have the effect of extending the leak sensing function of a leak detector to the irritation of a user attempting to dispense gasoline. Changes in environmental temperatures may expand or contract the gasoline (product) within the delivery line which will vary the pressure in the delivery line and have an effect upon the operation of the leak detector. Upon closing of the dispensing nozzle, a pressure wave rebounds from the dispensing nozzle upstream through the delivery line to the leak detector. The pressure wave, often referred to as hydraulic hammer, subjects the leak detector to a potential for severe damage of critical parts, including rupture of the diaphragm in a diaphragm type leak detector. Such damage may be undetected for an extended period of time. If leaks in the delivery line are present or result from the damaging effects of hydraulic hammer, the damaged leak detector would be incapable of serving the function of detecting such leaks. The resulting environmental and safety hazards would continue unchecked. Hydraulic hammer also causes the leak detector to open prematurely because of the resulting excess pressure downstream of the leak detector. Just turning on the pump, without actuating the nozzle, may cause hydraulic hammer to a detrimental extent.

A mechanical line leak detector is a pressure sensitive valve that incorporates a built-in metering device. The leak detector is placed into the line between the pump in fluid communication with an above-ground or an underground gasoline tank (storage tank) and the dispenser at the outflow end of the gasoline (product) delivery line in such a manner that the pump is on the upstream side of the leak detector and the delivery line and dispenser are on the downstream side. Most modern pumps for storage tanks have a leak detector port built in for this purpose. Simply stated, when the pump at the storage tank is energized, the leak detector will go to a slow-flow position (poppet valve completely down) for line pressurization. When sufficient line pressure has been achieved, the poppet valve will move upward to a metering position (cross-holes in the poppet valve aligned with a pin head). At this point, a predetermined amount of product is metered into the line downstream of the leak detector. If there is a leak in the line that is as great as or greater than the predetermined metered flow entering the line, the pressure in the line will not increase and the leak detector will not open for full product flow. If there is no leak, line pressure will continue to increase and the poppet valve will move to its full open position allowing full flow of product into the line. The functions recited above are true of all mechanical leak detectors known to date.

To have a trouble free leak detector, numerous problems must be addressed. These include: hydraulic hammer created in the line which may cause the leak detector to open prematurely; loss of line pressure due to a faulty check valve at the pump drawing product from the storage tank; lack of repeatedability in the metering position of the leak detector due to small tolerances that may vary over time; leak sensing or metering pressure in the line being too low to achieve the greatest sensitivity and speed of operation; thermal contraction in the line; high frequency pressure surge from the storage tank pump causing premature opening of the leak detector; premature closing of the leak detector during a fueling operation due to reduced pressure; and, excessive size and weight of prior art leak detectors rendering installation, maintenance and removal more of a problem than necessary.

SUMMARY OF THE INVENTION

A bore in the basket of a leak detector is drilled off center and supports a pin. Flow through a single side cross-hole of the poppet valve in proximity to the pin is adjustable by rotating the poppet valve about the pin to vary the clearance between the pin and the outlet of the single cross-hole. A clutch mechanism precludes movement of the poppet valve relative to the pin during normal use to maintain the clearance set except upon deliberate rotational adjustment thereof. The poppet valve, serving as one of two pistons, is attached by a shaft to a second piston. By maintaining the effective diameter of the second piston slightly smaller than that of the effective diameter of the piston represented by the poppet valve, significantly greater line pressure acting upon the second piston is required to overcome the pressure exerted by the pump at the storage tank upon the poppet valve. This results in significantly greater line pressure during the metering cycle and thereby accuracy and effectiveness is significantly improved. Such higher line pressure during the metering cycle also effectively reduces the effects of thermal contraction and line resiliency (air, line stretch, etc.,) during the metering cycle. Further, the initial surge of product upon actuation of the pump at the storage tank will not act upon the leak detector to cause the leak detector to step through to full flow prematurely as the initial flow from the pump is through a by-pass in the leak detector and directly into the line. With the reduced size second piston, leak detectors incorporating the present invention may be on the order of one-third of the weight and one-half of the size of prior art leak detectors.

It is therefore a primary object of the present invention to provide a leak detector which rapidly pressurizes a line to a high pressure.

Another object of the present invention is to provide a leak detector having an adjustable and maintainable flow rate through the poppet valve at each of the three modes of operation.

Yet another object of the present invention is to provide a leak detector having an adjustable flow rate past a metering pin by rotating the poppet valve about the pin.

Yet another object of the present invention is to provide a parked position for the leak detector which directs outflow from a storage tank directly into the line upon actuation of a pump.

Still another object of the present invention is to prevent an initial surge of product flow from causing a leak detector to begin its stepping functions.

A further object of the present invention is to provide a pressure balance between the pressure acting upon a poppet valve and a secondary piston by use of a relatively weak spring urging downward movement of the second piston.

A yet further object of the present invention is to provide a leak detector of small size and low weight;

A still further object of the present invention is to provide a method for stepping a leak detector through the steps of parked position, line fill, leak sense and full flow.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
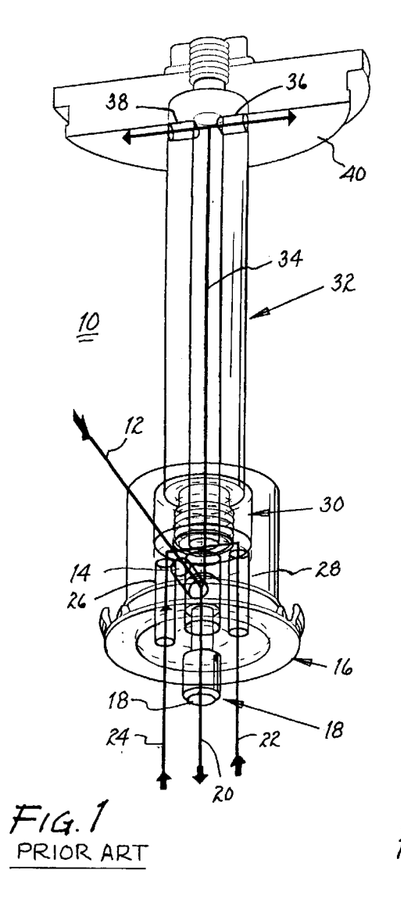
FIG. 1 is a schematic of the flow paths through a conventional prior art leak detector.
Figure 1A:
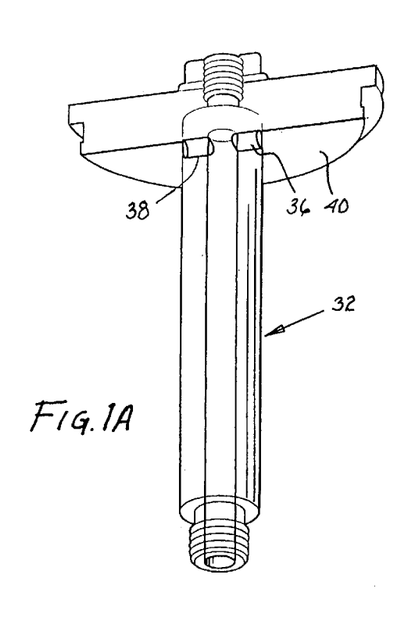
FIGS. 1A, 1B, 1C, 1D and 1E illustrate the discreet elements shown in FIG. 1.
Figure 1B:
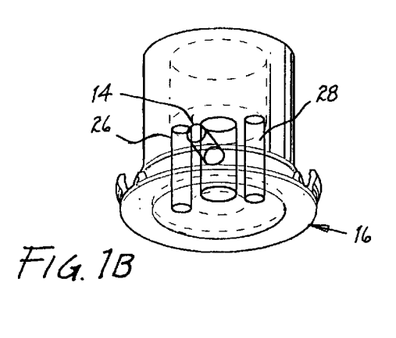
Figure 1C:
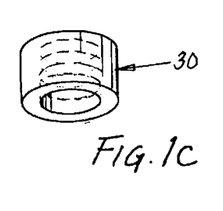
Figure 1D:
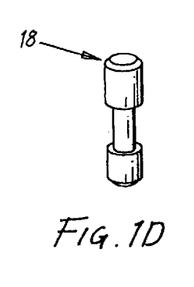
Figure 1E:
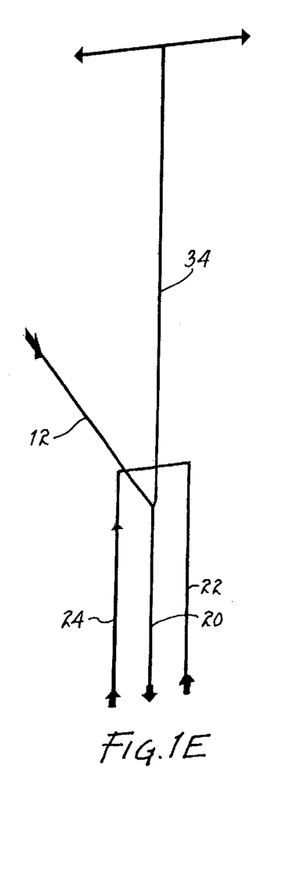

Referring to FIG. 1, there is illustrated a schematic of the operation of a leak detector 10 of a type that has been manufactured for a period of years; this type of leak detector is an industry standard and is used in conjunction with tens of thousands of gasoline storage tanks and delivery systems at retail service stations. The following discussion will refer jointly to FIGS. 1 and 1A to 1E. Inflow 12 results from actuation of a pump associated with an underground (aboveground) gasoline (product) storage tank. The inflow enters a channel 14 and into a poppet valve 16. The position of pin 18 within the poppet valve permits a limited rate outflow 20 into a line conveying the product to the gasoline dispenser at a service station. As the line fills, return flows 22, 24 enter leak detector 10 flowing upwardly through channels 26, 28 in the poppet valve. These return flows are channeled through a collar 30 and into a hollow shaft 32 threadedly connected to the collar and poppet valve 16. Flow 34 through the shaft is discharged through channels 36, 38 into a cylinder beneath piston 40 attached to shaft 32. The product collecting within the cylinder will cause piston 40 to rise. The raising of the piston will result in commensurate displacement of poppet valve 16 relative to pin 18 and further flow 20 will occur at a different rate to determine the presence of a leak. If no leak is found, further return flow 22, 24, will cause piston 40 to rise further until poppet valve 16 clears pin 18 resulting in full flow of product into the line.

As set forth above, hydraulic hammer in the line will affect the force of return flows 22, 24 and may result in false indications. Such false indications may include the raising of piston 40 to result in full flow without there having been an opportunity to sense for leaks in the system. Furthermore, the hydraulic hammer may cause damage to the components of the leak detector and compromise its integrity.

Figure 2:
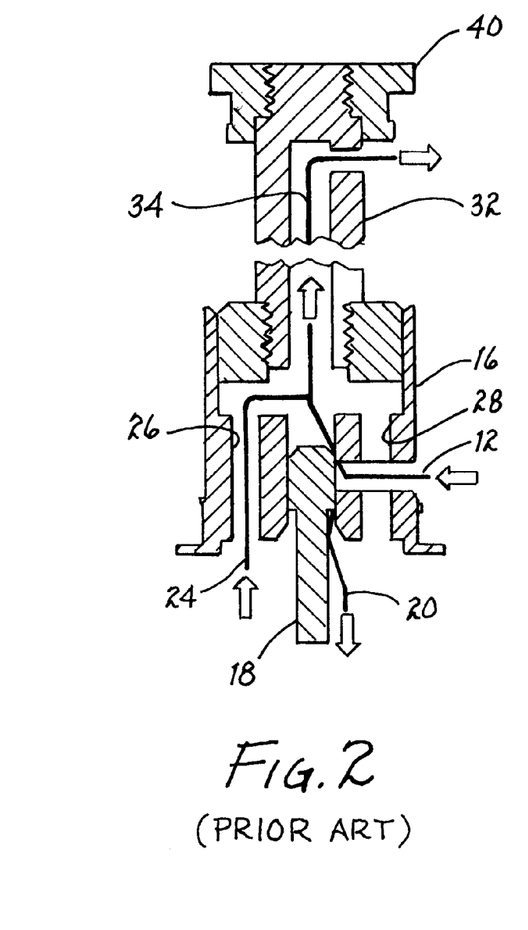
FIG. 2 illustrates the initial flow through a prior art leak detector.

Referring to FIG. 2, there is illustrated a further problem attendant prior art leak detectors. Upon actuation of a pump to pump product from an underground gasoline tank, there exists a high frequency pump surge in inflow 12. This inflow will flow past pin 18 in poppet valve 16 through shaft 32 and into the cylinder below piston 40. Simultaneously, a certain amount of product will flow past pin 18 in poppet valve 16 as outflow 20 into the line. A return flow 24 from the line will flow through the poppet valve channels 26, 28, through shaft 32 and into the cylinder adjacent piston 40. This surge of pressure acting upon piston 40 may cause a premature upward movement of piston 40, attached shaft 32 and poppet valve 16 relative to pin 18. The change in physical relationship between the pin and the poppet valve will affect the flow rate into the line and may cause premature stepping of the leak detector from step 1 (filling of the line) to step 3 (full flow) without conducting step 2 (leak detection).

Figure 3:
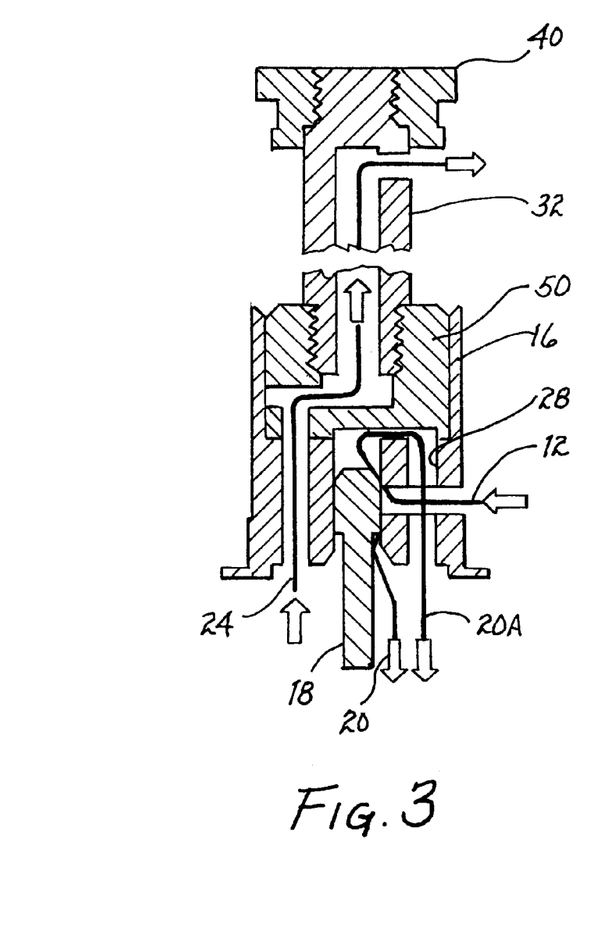
FIG. 3 illustrates the initial flow through the leak detector described herein.

In the present invention shown in FIG. 3, a flow director 50 is positioned with respect to and retained by poppet valve 16. The flow director precludes flow 12 of product from the pump into shaft 32 and to the cylinder adjacent piston 40. Instead, inflow 12 flows past pin 18 in poppet valve 16 to outflow 20. Additionally, inflow 12 flows past pin 18 upwardly adjacent flow director 50 and is channeled thereby into channel 28 in the poppet valve to be redirected downwardly to the line, as depicted by flow 20A. By initially directing all of the product into the line, the line will fill relatively quickly. Any pressure surge will be transmitted into the line and in fact enhance filling of the line to the extent necessary. After the line is filled, return flow 24 will occur and such flow will flow upwardly through shaft 32 into the cylinder beneath piston 40. Thereby, the present invention eliminates false actuation due to a high frequency pump surge as all of initial inflow 12 from the pump is directed into the line.

Figure 4:
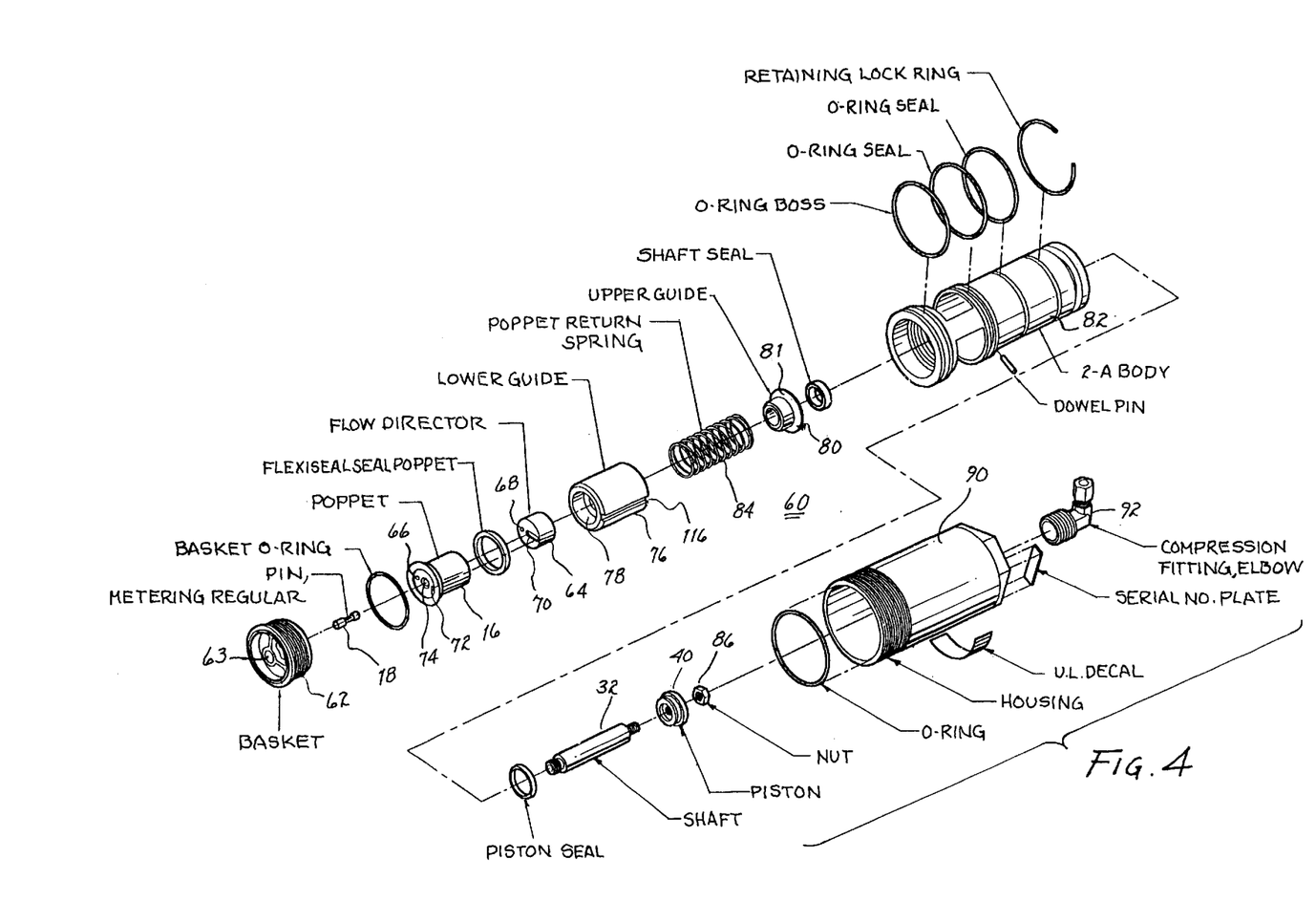
FIG. 4 illustrates an exploded view of the components of the present detector.

Referring to FIG. 4, there is illustrated an exploded view of the components of present leak detector 60. A conventional basket 62 supports pin 18 in a counterbore, which counterbore is slightly off-center. A poppet valve 16 penetrably receives pin 18 is passageway 74. A flow director 64 is at least partially disposed within poppet valve 16 (see FIG. 6). The engagement therebetween may be a press fit to ensure alignment between passageway 66 through the poppet valve with passageway 68 in the flow director and alignment of elongated cavity 70 with passageways 72, 74 in the poppet valve to cause return flow through passageway 72 of all flow upwardly through passageway 74. The flow director may be mechanically keyed to or otherwise attached to the poppet valve to ensure that there is not relative mechanical movement therebetween. Guide 76 includes a depression 78 for receiving flow director 64 and the upper end of the poppet valve. Shaft 32 is in threaded engagement with flow director 64. A guide 80 includes a shoulder 81 bearing against an annular flange 128 (see FIG. 6) disposed within casing 82 to limit upward movement of the guide. A spring 84 bears against shoulder 81 of the guide to urge downward movement of guide 76 and commensurate movement of shaft 32. A piston 40 is secured to shaft 32 and retained thereon by a nut 86. Piston 40 is disposed within a cylinder 120 (see FIG. 6) in casing 82. Basket 62 includes threads for threadedly engaging the lower end of casing 82, and an off-center counterbore 63 for supporting pin 18. A housing 90 contains casing 82 and the structures disposed therein. A fitting 92 is disposed at the upper end of housing 90 for fluid communication with the space attendant the top side of piston 40. Various O-rings and seals, as illustrated, are employed to serve various sealing functions. As illustrated, decals, serial number plates and the like may be disposed upon the housing.

Figure 5:
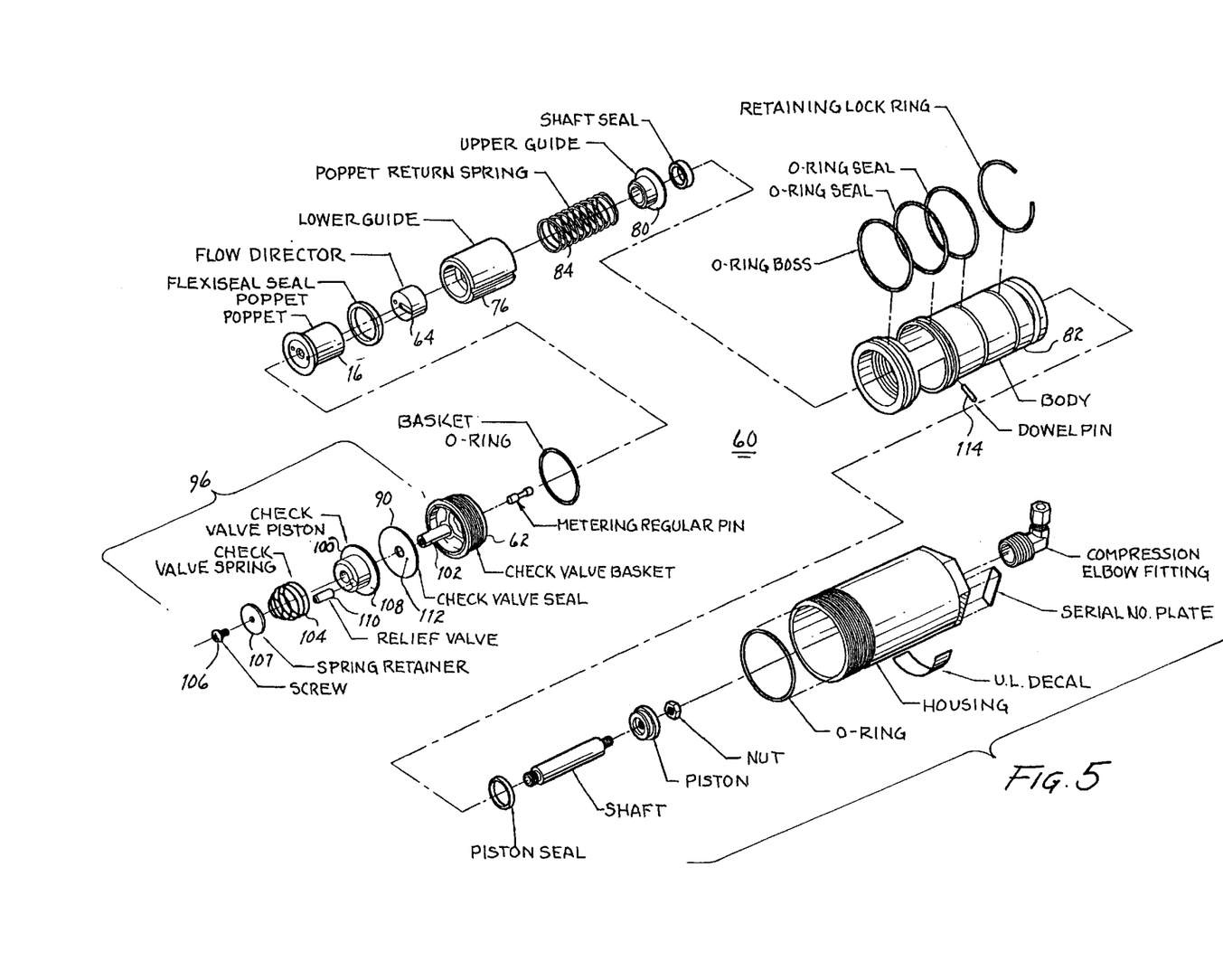
FIG. 5 illustrates an exploded view similar to FIG. 4 and also showing a check valve and its components.

Referring to FIG. 5, there is illustrated a leak detector like that described in FIG. 4. However, a check valve assembly 96 extends into the line from basket 62. The purpose of the check valve assembly is that of protecting the components of the leak detector against hydraulic hammer and other sudden pressure surges within the line that may occur during normal and abnormal operation. In essence, the check valve assembly includes a seal 98 and a piston 100 slidably mounted upon a shaft 102 extending downstream from basket 62. A spring 104 is retained in place by a screw 106 in threaded engagement with internally threaded shaft 102 and a washer 107 against which the spring bears. The other end of the spring bears against a flange 108 of piston 100. When the outflow pressure at basket 62 to is greater than line pressure, the outflow will cause seal 98 and piston 100 to translate against spring 104 along shaft 102 and permit flow into the line. When the line pressure is greater than the pressure within the basket, spring 104, acting against piston 100, will cause translation of piston 100 and seal 98 will seal the outlet of basket 62. A relief valve 110, including a corresponding aperture 112 in seal 98, will accommodate controlled flow through the check valve. The remaining elements illustrated in FIG. 5 correspond with those discussed above with respect to FIG. 4.

Figure 6:
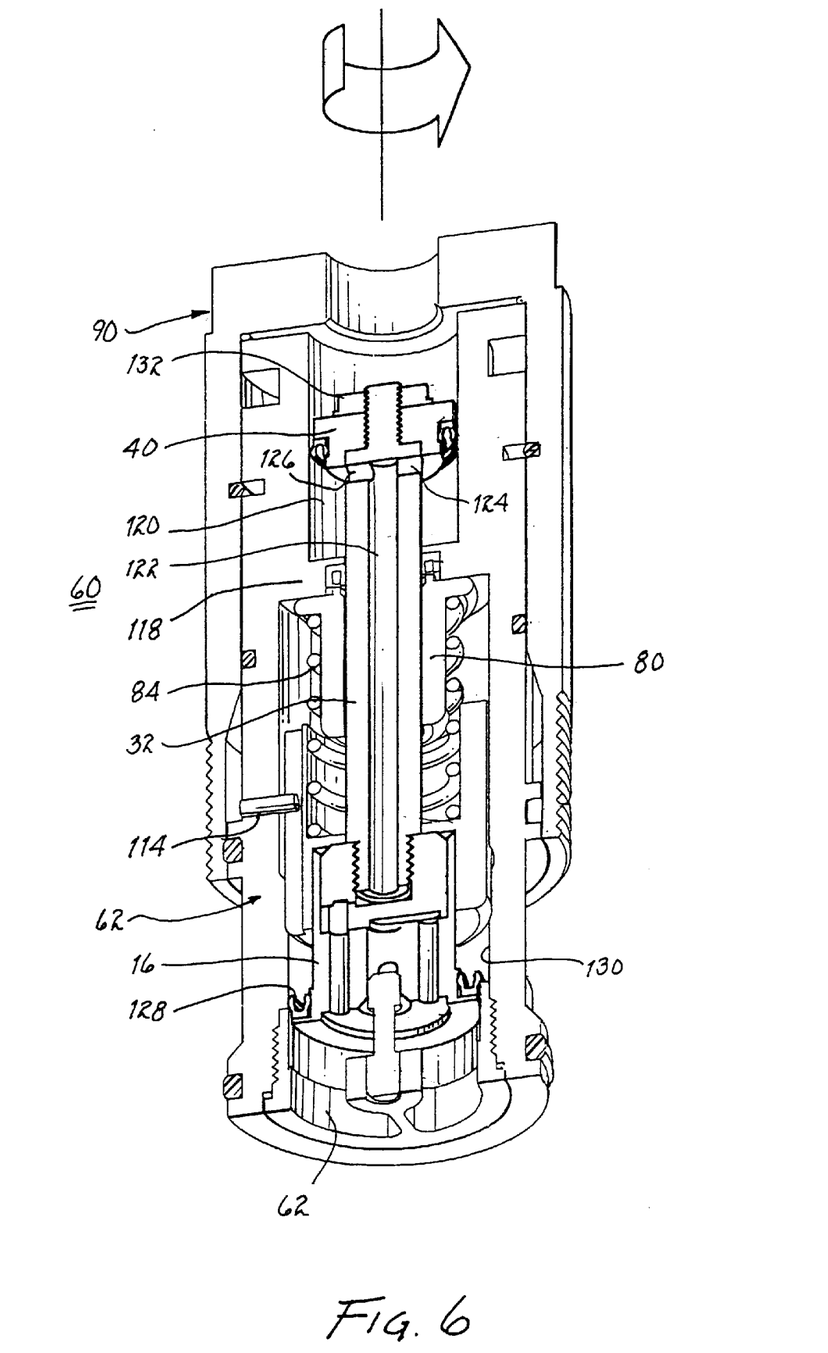
FIG. 6 illustrates a cross-sectional view of the leak detector.
Figure 7:
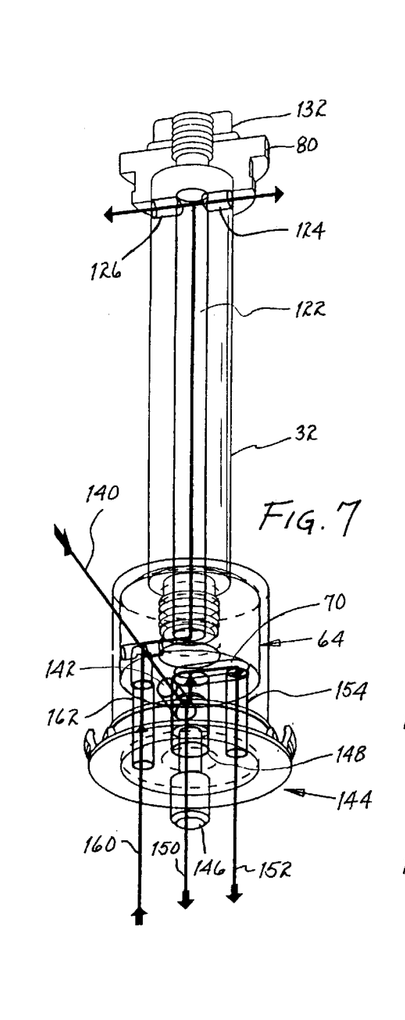
FIG. 7 illustrates a schematic of the flow paths through present the leak detector to show the differences in the flow path from that of the prior art shown in FIG. 1.
Figures 7A, 7B, 7C, 7D, 7E:
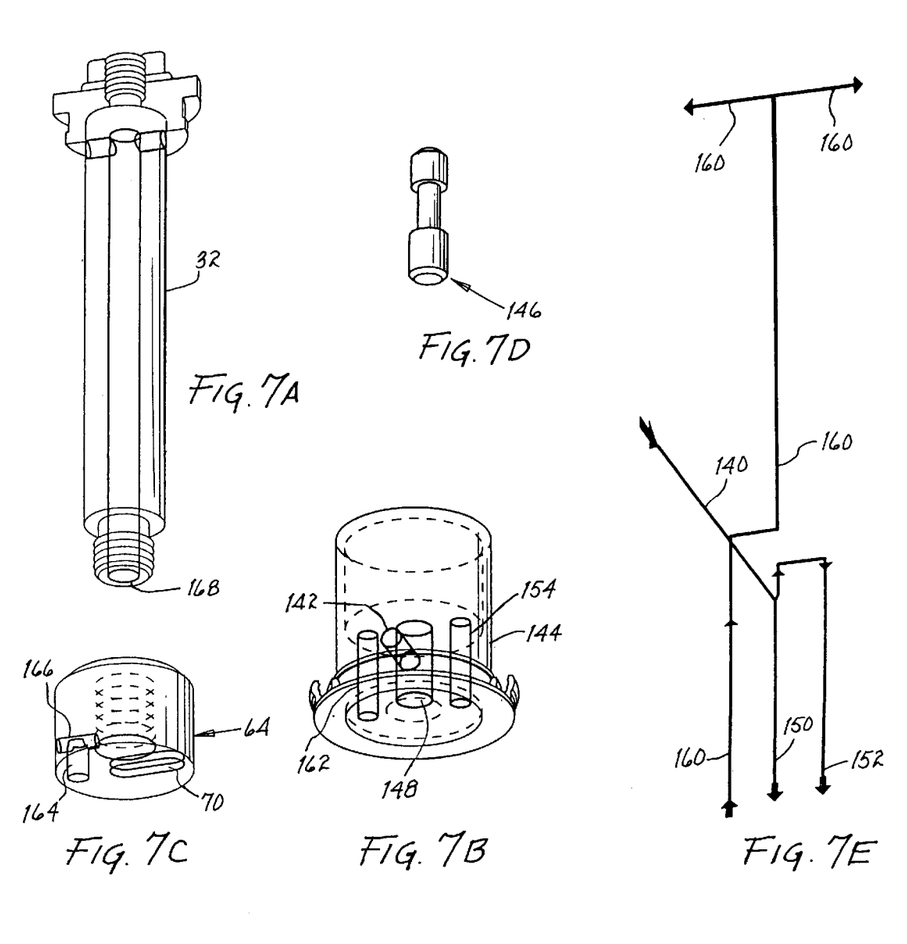
FIGS. 7A, 7B, 7C, 7D, and 7E illustrates the discreet elements shown in FIG. 7 of the present leak detector and illustrate the differences with the corresponding components of the prior art shown in FIGS. 1A through 1E.

Referring to FIG. 6, there is illustrated a cross-sectional view of leak detector 60 in its assembled state. Certain features not evident from the exploded view shown in FIGS. 4 and 5 will be described. Pin 114 is lodged in casing 62 and extends into slot 116 extending longitudinally along guide 76 to preclude rotation of the guide. The earlier discussed annular flange 118 extending regularly inwardly within casing 62 serves as a shoulder against which guide 80 bears and which limits the upward movement of the guide. As is evident in FIG. 6, upward movement of poppet valve 16 will result in upward movement of shaft 32 which movement is restrained by compression of spring 84. Flow into cylinder 120 beneath piston 40 and within casing 62 occurs from the poppet valve through passageway 122 and lateral channels 124, 126 in the shaft. A seal 128 about the base of the poppet valve precludes flow of product between the poppet valve and lower cylindrical surface 130 of casing 62. Basket 62 is essentially flush with the bottom of the casing, as illustrated. As will be described in further detail below, piston 40 is secured to shaft 32 by a nut 132.

Referring jointly to FIGS. 7, 7A, 7B, 7C, 7D and 7E, the difference in flow paths upon initial actuation of the pump to pump product from a storage tank into leak detector 60 will be described. In this discussion it may be well to also refer to FIGS. 1, 1A, 1B, 1C, 1D, and 1E which illustrate the commensurate flow path in a prior art leak detector. Inflow 140 from the pump enters a channel 142 in poppet valve 144. As a result of the off-center position of pin 146 relative to passageway 148 in poppet valve 144, and outflow 150 of product into the line will result through the passageway past the pin. A further flow of product from inflow 140 will flow upwardly into an elongated cavity 70 in flow director 64. Outflow 152 will flow from the cavity and through a passageway 154 in the poppet valve. No inflow of product will find its way into passageway 122 of hollow shaft 32. As the line becomes full, a return flow 160 will flow into passageway 162 of the poppet valve. This passageway is in fluid communication with passageways 164, 166 in flow director 64 to direct such return flow into opening 168 at the bottom of hollow shaft 32. The return flow will flow upwardly through the shaft and be exhausted through passageway 124, 126 into the cylinder beneath piston 80. Thereby, flow director 64 precludes an initial pressure surge from causing any flow of product through the shaft and into the cylinder beneath piston 80.

Figure 8A:
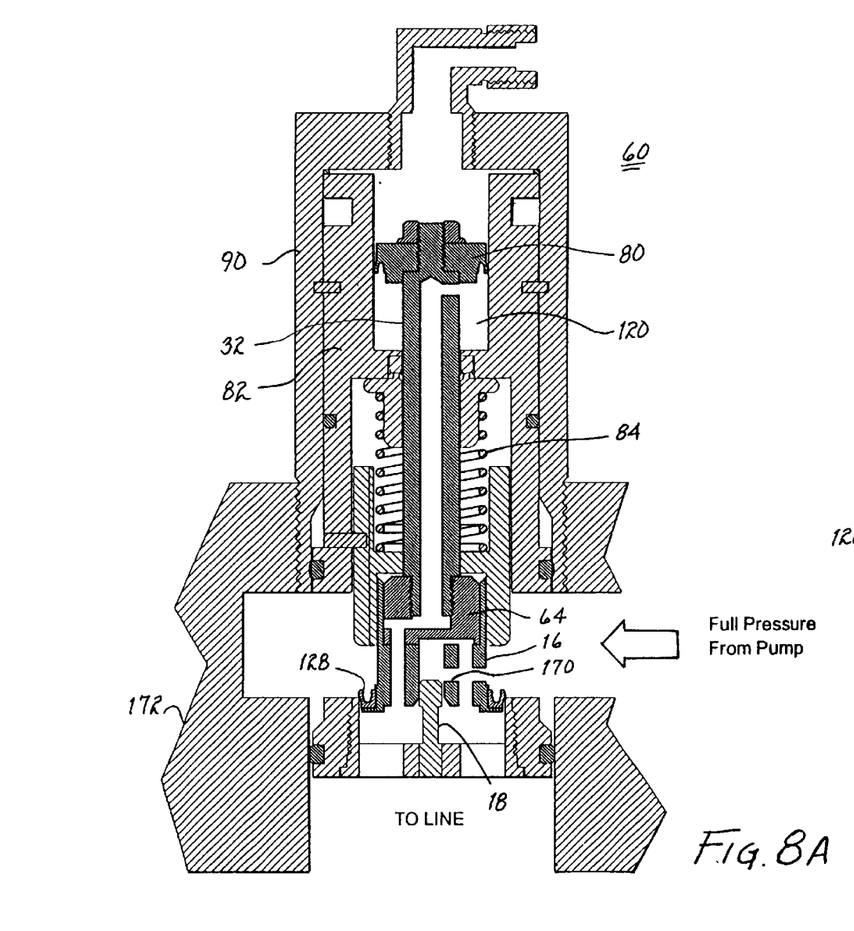
FIGS. 8A and 8B show cross-sectional views of the components of the leak detector in its parked position.
Figure 8B:
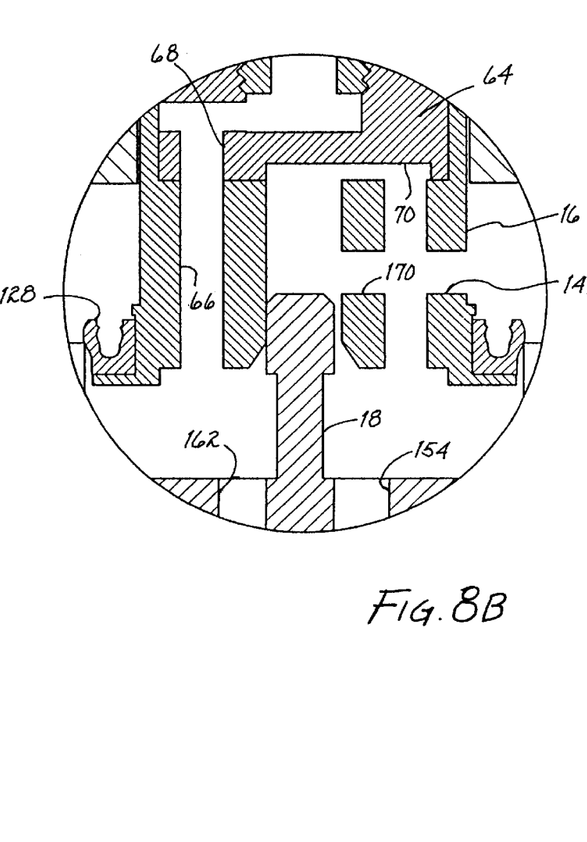

Referring jointly to FIGS. 8A and 8B, the "parked" position for leak detector 60 will be described. When the pressure within the line from the leak detector to a dispensing pump drops to approximately 5 psi, the pressure within cylinder 120 acting upon piston 80 is insufficient to overcome the spring force of spring 84. Consequently, poppet valve 16 will translate downwardly to its "parked" position, as illustrated. In this position, the bottom of the poppet valve cross-hole 170 is essentially aligned with the top of pin 18. In this parked position, leak detector 60 is in the initial position ready to receive an inflow of product from the pump associated with the supply of product (tank). For reference purpose, a receiver 172 at the inlet end of the line to the dispensing pump is shown and housing 90 is in threaded engagement therewith.

Figure 9A:
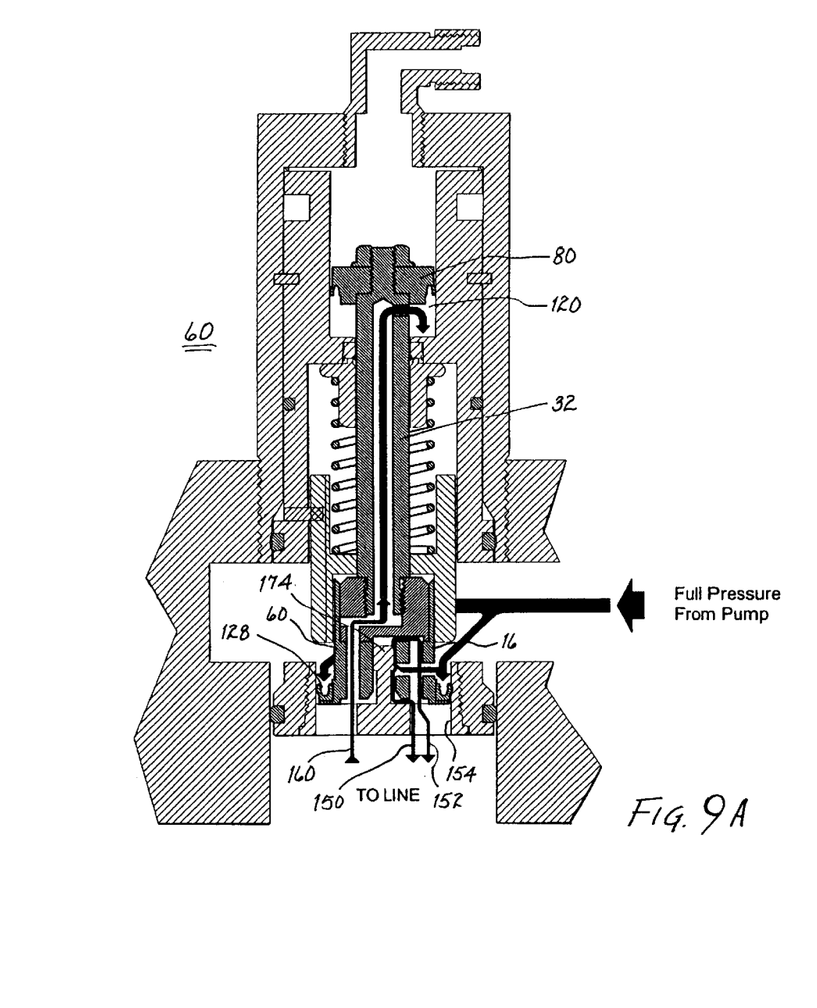
FIGS. 9A and 9B show cross-sectional view of the components of the leak detector in the reset position.
Figure 9B:
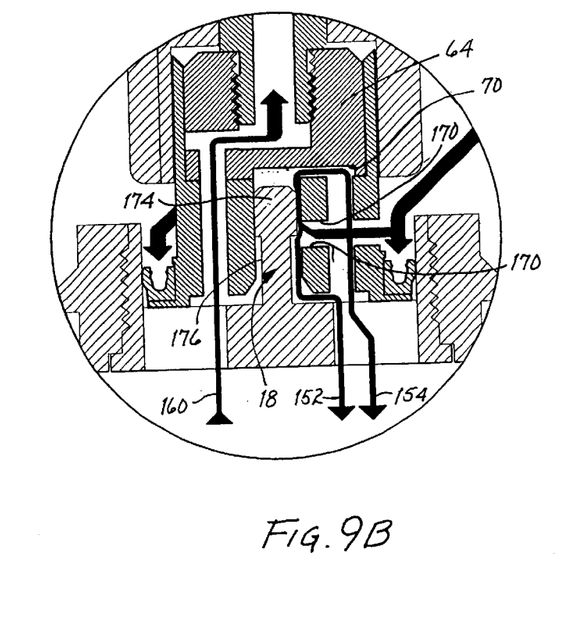

Upon actuation of the pump, the initial pressure surge will cause flow of product into the poppet valve and out through channel 154. As the pressure and product flow continue, pressure acting upon seal 128 sealing the perimeter of the lower end of poppet valve 16 will urge downward movement of the poppet valve to the position shown in FIGS. 9A and 9B. In this position, cross-hole 170 of the poppet valve will essentially straddle the bottom edge of head 174 of pin 18. This will result in flow of product through the cross-hole and upwardly past the head of the pin into cavity 70 of flow director 64 and thereafter downwardly through the poppet valve to exit through the passageway 154. Simultaneously, flow of product from the outlet of the cross-hole will flow downwardly adjacent shaft 176 of pin 18 and into passageway 154. The downward movement of poppet valve 16 results in commensurate translation of shaft 32 and downward movement of piston 80. As all of the product inflowing into the poppet valve is directed downstream into the line, the line will quickly fill. After fill, return flow will flow through the poppet valve, the flow director and the shaft into cylinder 120 beneath piston 80. In this position of the poppet valve, the flow rate is approximately one and a half gallons per minute (1½ gal./min), which flow rate is an industry standard. This is the line fill mode.

Figure 10A:
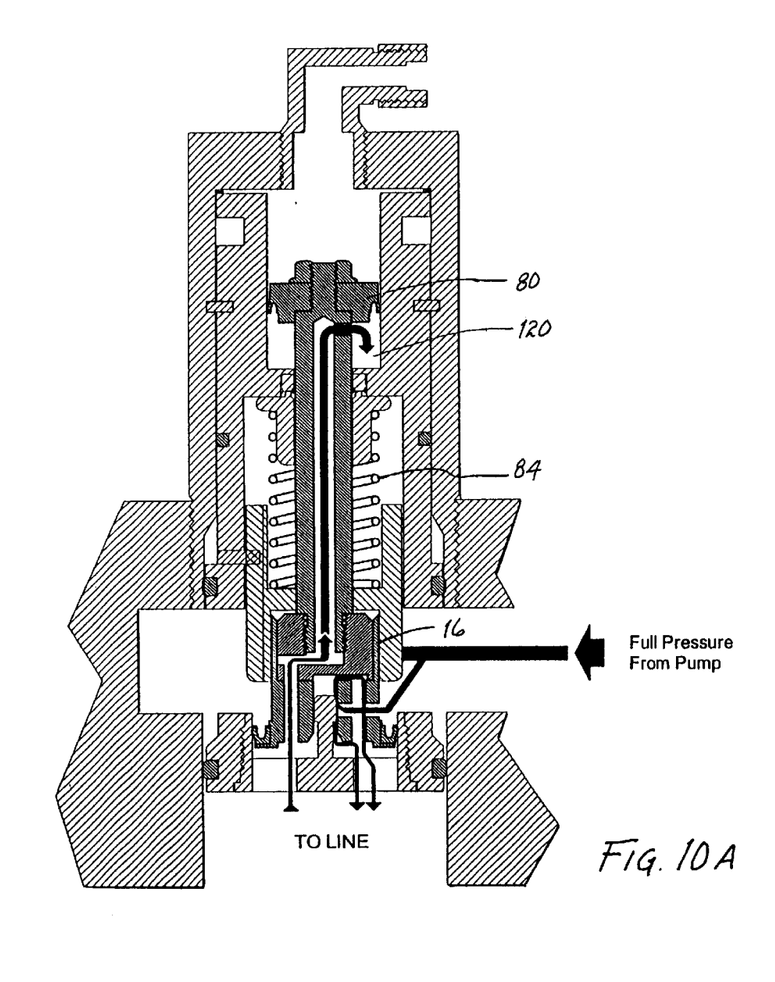
FIGS. 10A and 10B show cross-sectional view of the components of the leak detector in the leak sense position.
Figure 10B:
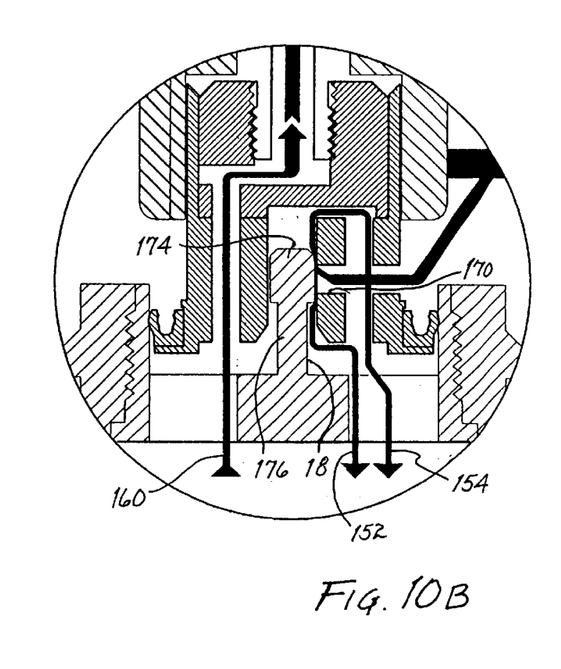

As the line pressure reaches approximately 21 psi, the pressure within cylinder 120 acting upon piston 80 will overcome the spring force exerted by spring 84 and the piston will rise. A commensurate repositioning of poppet valve 16 will occur. Raising the poppet valve will reposition cross-hole 170 in alignment with the side of head 174 of pin 18, as shown in FIGS. 10A and 10B. Outflows 152 and 154 will continue but at a reduced combined rate of two gallons per hour (2 gal./hr). This is the leak sense mode. In the event that there is a leak of 2 gal./hr or more downstream of leak detector 60, there will be no further pressure buildup within the cylinder 120. Without further repositioning of piston 80 as a result of an increase in pressure within cylinder 120, the flow rate through the leak detector will be limited to two gallons per hour.

Figure 11A:
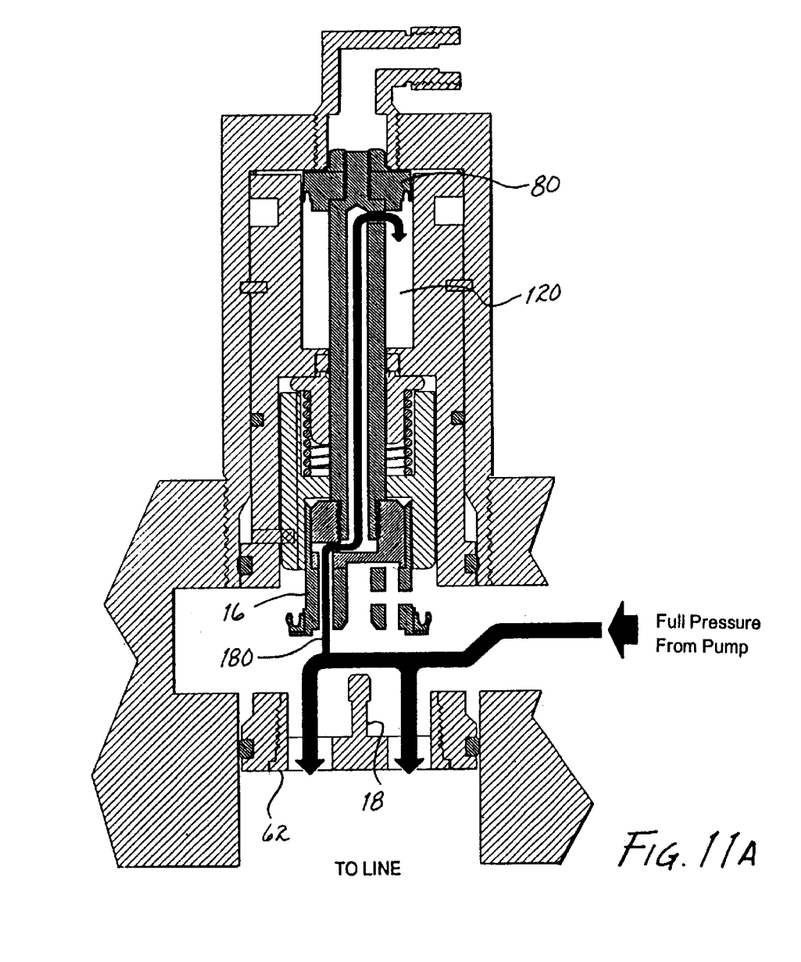
FIGS. 11A and 11B show cross-sectional view of the components of the leak detector in the full flow position.
Figure 11B:
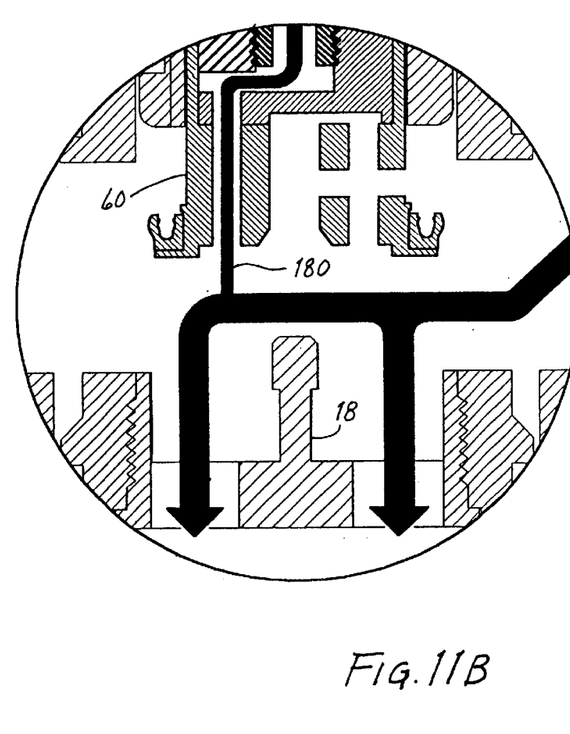
Figure 12:
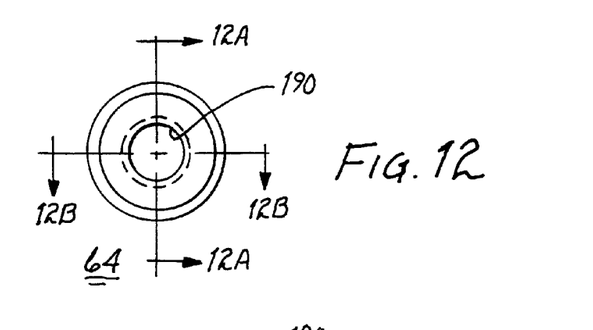
FIG. 12 is a bottom view of the flow director particularly shown in FIGS. 4 and 5.
Figure 12A:
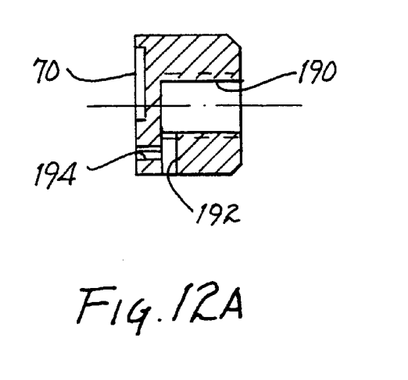
FIG. 12A is a cross-sectional view taken along lines 12A—12A, shown in FIG. 12.
Figure 12B:
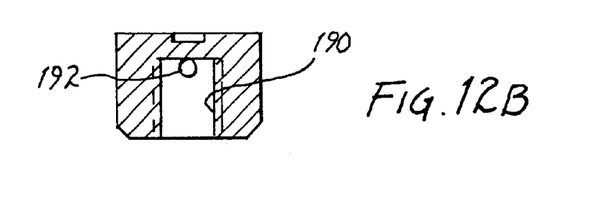
FIG. 12B is a cross-sectional view taken along lines 12B—12B, shown in FIG. 12.
Figure 12C:
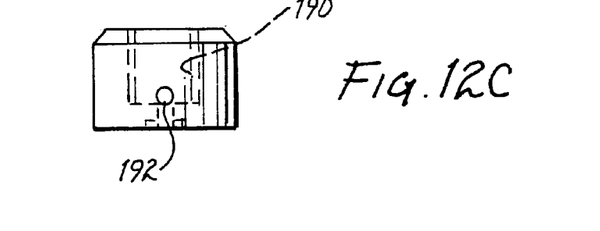
FIG. 12C is a side view of the flow director.
Figure 12D:
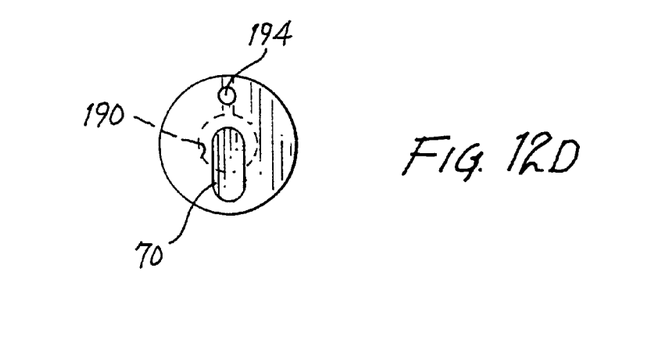
FIG. 12D is a top view of the flow director.

In the event there is no leak in the line or there is a leak less than two gallons per hour, the pressure within cylinder 120 will continue to increase and the volume will increase resulting in upward movement of piston 80, as shown in FIG. 11A. The resulting upward movement of piston 80 will produce a commensurate movement of poppet valve 16, as shown in FIG. 11B. At approximately 24 psi within cylinder 120, the poppet valve will have been raised sufficiently to clear pin 18. Upon such clearance, the full pressure exerted by the pump at the storage tank will be translated into a commensurate pressure within cylinder 120, as depicted by flow path 180. Moreover, the poppet valve will no longer restrain outflow of product through basket 62 into the line.

Referring jointly to FIG. 12 and FIGS. 12A, 12B, 12C, 12D, details of flow director 64 will be described. The flow director includes a threaded cavity 190 for threadedly engaging the lower end of shaft 32. A passageway 192 in combination with passageway 194 constitute, in essence, a single passageway to accommodate flow through the flow director from the poppet valve into passageway 122 within shaft 32. A cavity 70 is formed in the bottom surface of the flow director to redirect flow upwardly from about the metering pin in the poppet valve into downward flow through a passageway in the poppet valve.

The poppet valve of prior art leak detectors included a pair of opposed cross-holes for cooperating with the pin extending from the basket for limiting flow through the poppet valve as a function of the mode of a leak detector. Such mechanical arrangement rendered it very difficult to adjust in the field the flow rates through the cross-holes during line fill and leak sense modes. Essentially, any adjustments had to be made by replacing the metering pin with a metering pin of different size. Field adjustments of this type were expensive and time consuming. Therefore, workman often replaced the complete leak detector. By using a single cross-hole and having the pin off-center with respect to its corresponding passageway, its proximity to the outlet of the cross-hole could be adjusted by simply rotating the poppet valve to place the outlet of the cross-hole laterally closer or further away from the head of the pin.

Referring to FIG. 6, there is shown a nut 132 disposed at the top of piston 40. By rotating this nut, in a clockwise direction, the shaft, the flow director and the poppet valve housing would rotate a commensurate amount relative to the non-rotatable fixed off-center mounted pin. Thereby, the lateral distance between the head of the pin and the cross-hole could be easily adjusted in the field. Pin 114, engaging slot 116 of guide 76 precludes rotation of the guide. By creating a close high friction press fit between cavity 78 in the guide and the part of the poppet valve disposed therein, a clutch is created to prevent unwanted rotation of the poppet valve about its longitudinal axis except upon deliberate rotation of shaft 32 via its threadedly attached nut 132. The flow director and the poppet valve must be mechanically attached or keyed with one another to prevent relative rotation therebetween about their common longitudinal axis.

The poppet valve attached to one end of shaft 32 is in the nature of a piston translatable along a cylindrical cavity and downward movement is urged by fluid pressure exerted by the upstream pump. Piston 40, disposed at the opposite end of the shaft is urged upwardly by pressure in cylinder 120 as a result of flow of product from the line downstream of the poppet valve. The relative effective area of the poppet valve is approximately 40% of the effective area of the piston. For example, the piston may be about 1 inch in diameter and the poppet valve may be about 1¼ inches in diameter. In order to achieve upward movement of shaft 32 and ultimate displacement of the poppet valve from the metering pin, the upward force exerted upon piston 40 by the pressure in cylinder 120 must be greater than the downward force exerted upon the poppet valve by the pressure of the pump. If the force acting on the piston is slightly more than the force acting upon the poppet valve, significant line pressure must be present in order to result in upward translation of shaft 32. Such requirement for significant line pressure enhances the likelihood of rapidly detecting a leak.

Because prior art devices embodied a piston of significantly larger size diameter than that of the poppet valve, a much lesser line of pressure was required to result in displacement of the poppet valve from the metering pin. Thus, a much lower pressure was present during a metering mode of the leak detector. Furthermore, resetting the leak detector was more difficult with a significantly larger diameter piston when there was any head pressure present in the line and required a much stronger spring to urge downward movement of the poppet valve.

The reduced required size of the piston in the present invention permits a reduced diameter casing and housing, which has the further benefit of significant weight reduction.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

I claim:

1. A leak detector for use with a pump pumping product from a storage tank through said leak detector into a line having an outlet at a product dispenser, said leak detector comprising in combination;
   a) a poppet valve having a passageway and a single cross-hole in fluid communication with said passageway;
   b) a metering pin cooperating with said poppet valve to meter flow through said cross-hole into said passageway of said poppet valve as a function of the position of said poppet valve relative to said pin, said pin being mounted off-center of said passageway;
   c) means for rotating said poppet valve to adjust the spacing between said pin and said cross-hole as a function of the rotational position of said poppet valve;
   d) a flow director for directing a flow of product into the line upon initial actuation of the pump;
   e) a piston having an effective area less than the effective area of said poppet valve, said piston being axially translatable in response to return flow of product from the line to displace said poppet valve relative to said pin during flow of product into the line; and
   f) a spring for restraining displacement of said poppet valve in response to translation of said piston.

2. A leak detector as set forth in claim 1 including a check valve for preventing flow of product into said leak detector from the line when the line pressure of the product is greater than the pressure of the product exerted upon said leak detector by the pump.

3. A leak detector as set forth in claim 1 wherein said poppet valve includes a further passageway for directing flow of product from the pump into the line and wherein said flow director directs flow of product from about said pin within said passageway into said further passageway.

4. A leak detector as set forth in claim 3 wherein said flow director includes a yet further passageway for directing product from the line into a cylinder associated with said piston.

5. A leak detector as set forth in claim 1 including a hollow shaft interconnecting said poppet valve with said piston.

6. A leak detector as set forth in claim 5 including means for rotating said shaft to rotationally reposition said poppet valve relative to said pin to adjust the spacing between said pin and said cross-hole.

7. A method for detecting a leak of product downstream of a leak detector in fluid communication with a pump for pumping the product from a tank, said method comprising the steps of:
   a) directing all of the initial flow of product from the pump directly into the line;
   b) metering the flow rate of product into the line at a first rate with a poppet valve having a single cross-hole directing the product to and about a metering pin during a line fill mode;
   c) displacing the poppet valve relative to the pin to establish a second rate of product flow into the line during a leak sense mode;
   d) further displacing the poppet valve to prevent the metering pin from restricting flow through the leak detector during a fill flow mode; and
   e) adjusting the pin controlled flow rate by rotating the poppet valve relative to the pin to adjust the distance between the outlet of the cross-hole and the metering pin.

8. A method as set forth in claim 7 including a shaft attached to the poppet valve and wherein said step of adjusting is performed by rotating the shaft.

9. A method as set forth in claim 7 including the step of controlling the displacement of the poppet valve with a piston having an effective diameter less than the effective diameter of the poppet valve, the piston being positionally responsive to the difference between the pressure extended upon the poppet valve by product flowing from the pump and the pressure of the product in the line translated to the piston which pressure difference is in excess of the force exerted by a spring restraining movement of the poppet valve.

10. A method for adjusting a leak detector having a poppet valve and an associated pin for metering flow of product through the poppet valve, the poppet valve including a single cross-hole for directing flow of product to be metered into a central passageway, the leak detector including a basket for supporting the metering pin off-center within the passageway of the poppet valve, said method including the steps of:
   a) rotating the poppet valve to set the space between the outlet of the cross-hole and the metering pin; and
   b) restraining rotational movement of the poppet valve with a clutch.

11. A leak detector for use with a pump pumping product from a storage tank through said leak detector into a line having an outlet at a product dispenser, said leak detector comprising in combination:
   a) a poppet valve having a passageway and a single cross-hole in fluid communication with said passageway;
   b) a metering pin cooperating with said poppet valve to meter flow through said cross-hole of said poppet valve as a function of the spacing between said cross-hole and said metering pin, said pin being mounted off-center of said passageway; and
   c) means for rotating said poppet valve to adjust the spacing between said cross-hole and said pin as a function of the rotational position of said poppet valve.

12. A leak detector as set forth in claim 11 including a check valve for preventing flow of product into said leak detector from the line when the line pressure of the product is greater than the pressure of the product exerted upon said leak detector by the pump.

13. A leak detector as set forth in claim 11 including a piston having a diameter less than the diameter of said poppet valve, said piston being axially translatable in response to return flow of product from the line to displace said poppet valve relative to said pin during flow of product into the line.

14. A leak detector as set forth in claim 13 including a shaft interconnecting said poppet valve with said piston.

15. A leak detector as set forth in claim 14 including means for rotating said shaft to rotationally reposition said poppet valve relative to said pin to adjust the spacing between said pin and said cross-hole.

16. A leak detector for use with a pump pumping product from a storage tank through said leak detector into a line having an outlet at a product dispenser, said leak detector comprising in combination:
   a) a poppet valve having a passageway and a further passageway;
   b) a metering pin cooperating with said poppet valve to meter flow through said passageway; and
   c) a flow director for directing all flow of product into the line through said further passageway upon initial actuation of the pump.

17. A leak detector as set forth in claim 16 including a check valve for preventing flow of product into said leak detector from the line when the line pressure of the product is greater than the pressure of the product exerted upon said leak detector by the pump.

18. A leak detector as set forth in claim 16 wherein said flow director directs flow of product from about said pin within said passageway into said further passageway.

19. A leak detector as set forth in claim 16 including a piston interconnected with said poppet valve, said piston having a diameter less than the diameter of said poppet valve, said piston being axially translatable in response to return flow of product from the line to displace said poppet valve relative to said pin during flow of product into the line.

20. A leak detector as set forth in claim 19 including a hollow shaft interconnecting said poppet valve with said piston.

21. A leak detector as set forth in claim 20 including means for rotating said shaft to rotationally reposition said poppet valve relative to said pin and to adjust the spacing between said pin and said cross-hole.

* * * * *